(12) United States Patent
Stiehler et al.

(10) Patent No.: US 10,287,989 B2
(45) Date of Patent: May 14, 2019

(54) SEAL SUPPORT OF TITANIUM ALUMINIDE FOR A TURBOMACHINE

(71) Applicant: MTU Aero Engines AG, Munich (DE)

(72) Inventors: Frank Stiehler, Bad Liebenwerda (DE); Stephan Klaen, Munich (DE); Stefan Busam, Greifenberg (DE); Bernhard Theis, Munich (DE)

(73) Assignee: MTU AERO ENGINES AG, Munich (DE)

( * ) Notice: Subject to any disclaimer, the term of this patent is extended or adjusted under 35 U.S.C. 154(b) by 1311 days.

(21) Appl. No.: 14/166,167

(22) Filed: Jan. 28, 2014

(65) Prior Publication Data

US 2014/0227080 A1 Aug. 14, 2014

(30) Foreign Application Priority Data

Jan. 30, 2013 (EP) .................................. 13153184

(51) Int. Cl.
*F02C 7/28* (2006.01)
*F01D 11/00* (2006.01)

(52) U.S. Cl.
CPC .............. *F02C 7/28* (2013.01); *F01D 11/001* (2013.01); *F05D 2300/182* (2013.01); *Y10T 29/49297* (2015.01)

(58) Field of Classification Search
CPC .......... F02C 7/28; F01D 11/02; F01D 11/001; F01D 11/025; Y10T 29/49297; F16J 15/3288

See application file for complete search history.

(56) References Cited

U.S. PATENT DOCUMENTS

| 5,096,376 | A | * | 3/1992 | Mason | .................... | F01D 11/02 |
| | | | | | | 277/414 |
| 5,215,435 | A | * | 6/1993 | Webb | ........................ | F01D 5/08 |
| | | | | | | 277/414 |
| 5,522,698 | A | * | 6/1996 | Butler | .................... | F01D 11/001 |
| | | | | | | 277/355 |
| 7,430,802 | B2 | * | 10/2008 | Tiemann | ............... | F01D 5/3015 |
| | | | | | | 29/889.22 |
| 8,079,803 | B2 | * | 12/2011 | Takamura | ............... | F01D 5/081 |
| | | | | | | 415/115 |
| 8,186,938 | B2 | * | 5/2012 | Young | .................... | F01D 11/001 |
| | | | | | | 415/113 |

(Continued)

FOREIGN PATENT DOCUMENTS

DE 102008048006 A1 3/2010

*Primary Examiner* — Aaron R Eastman
(74) *Attorney, Agent, or Firm* — Abel Schillinger, LLP (57) ABSTRACT

Disclosed is a turbomachine having an annular flow duct and a housing structure surrounding the flow duct and a multiplicity of guide vanes and rotor blades which are arranged in the flow duct. The rotor blades are rotatably accommodated in the housing structure whereas the guide vanes are fixed in the housing structure, a plurality of guide vanes forming an annular guide vane ring. The housing structure has a seal in the region of the radially inner flow duct boundary in order to prevent hot gas escaping from the flow duct, which seal is arranged on guide vane roots of the guide vanes of the guide vane ring via a seal support and forms a seal against a rotatable seal surface, the seal support being formed from an intermetallic material, in particular a TiAl material.

20 Claims, 6 Drawing Sheets

(56) References Cited

U.S. PATENT DOCUMENTS

| | | | |
|---|---|---|---|
| 8,534,673 B2* | 9/2013 | Scimeca | F01D 11/001 |
| | | | 277/416 |
| 8,888,461 B2* | 11/2014 | Smarsly | C22C 14/00 |
| | | | 415/200 |
| 2009/0304497 A1* | 12/2009 | Meier | F01D 11/001 |
| | | | 415/170.1 |
| 2011/0193293 A1* | 8/2011 | Mega | F01D 5/081 |
| | | | 277/412 |
| 2012/0321453 A1* | 12/2012 | Alvanos | F01D 5/081 |
| | | | 415/180 |

* cited by examiner

SEAL SUPPORT OF TITANIUM ALUMINIDE FOR A TURBOMACHINE

CROSS-REFERENCE TO RELATED APPLICATIONS

The present application claims priority under 35 U.S.C. § 119 of European Patent Application No. 13153184.0, filed Jan. 30, 2013, the entire disclosure of which is expressly incorporated by reference herein.

BACKGROUND OF THE INVENTION

1. Field of the Invention

The present invention relates to a turbomachine, such as a static gas turbine or an aero engine, specifically to a seal support and production thereof for use in the region of what is termed the inner air seal (IAS) of a turbomachine.

2. Discussion of Background Information

Turbomachines, such as static gas turbines and aero engines, have been known for a long time and are used in many ways. Such turbomachines have an annular flow duct in which rotatable rotor blades and static guide vanes are arranged in the form of rotor blade rings and guide vane rings. The air flowing in is compressed, in the region of the compressor, by the arrangement of the rotor blade rings and guide vane rings and, in the region of the turbine, the turbomachine can be driven by the hot gas flowing out of the combustor. In order to achieve a high degree of efficiency, the housing structure surrounding the flow duct is formed, as far as possible, such that in optimum circumstances all the fluid flowing through the turbomachine has to flow past the guide vanes and rotor blades in the flow duct and radial gas losses are avoided. Accordingly, it is known to provide, in the housing structure, what are termed inner air seals and outer air seals as radially inner and radially outer seals for the flow fluid.

Figure 10:
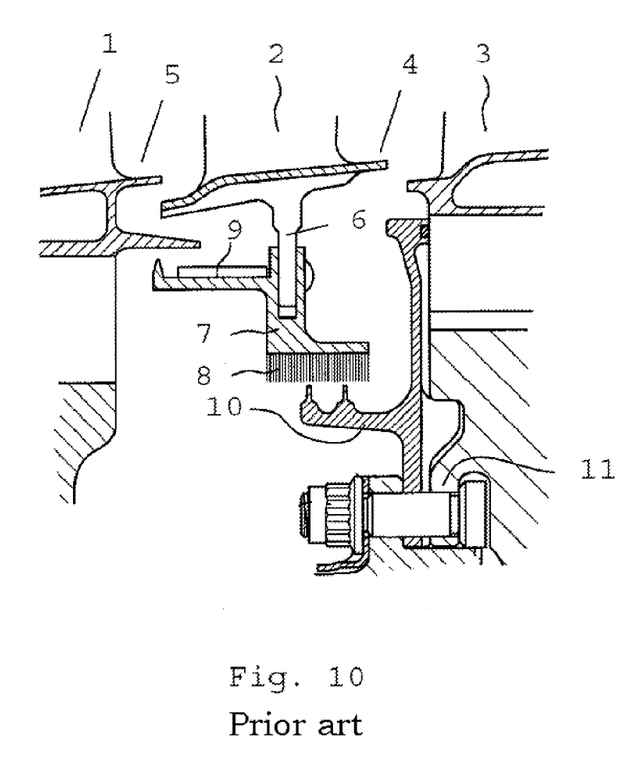
FIG. 10 shows a partial longitudinal section through a turbomachine along the axial direction in order to illustrate a seal support of the prior art.

For the turbine sector, DE 10 2008 048 006 A1 describes an example of a seal arrangement in the region of the inner air seal (IAS), which is also shown in the attached FIG. 10. FIG. 10 shows here, in section along the axial direction of the turbomachine, a first rotor blade row 1, a guide vane ring 2 and a further rotor blade row 3. An inner shroud 5 is arranged on the rotor blades and an inner shroud 4 is arranged on the guide vanes, these shrouds together forming the radially inner boundary wall of the flow duct. Hot gas can, however, escape radially from the flow duct through the gaps between the rotor blades and guide vanes such that, in the radially inner housing structure, a seal arrangement is provided whose seal 8 is arranged on the vane roots 6 of the guide vanes 2 by means of a seal support 7.

On the seal support 7 there is provided, on one hand, what is termed a cover element 9 which, together with an axially projecting region of the rotor blade ring 1, forms what is termed a labyrinth seal in order to avoid the direct penetration of hot gas from the flow duct into the cavity of the housing structure. Furthermore, there is provided on the seal support 7 a honeycomb seal 8 which is in engagement with a seal structure 10 which corotates with the rotor blade ring 3 (element 11 representing a flange).

Although such a seal in the region of the radially inner housing structure performs its sealing duties reliably, there is a need for further improvement as, in particular in the case of aero engines, reducing the weight of the turbomachine is a constant aim.

It would therefore be advantageous to have available a turbomachine and in particular a seal support for an inner air seal (IAS) which ensures safe and reliable sealing of the radially inner housing structure with respect to hot gas from the flow duct of the turbine region of the turbomachine but which allows for a reduction in the weight of the turbomachine.

SUMMARY OF THE INVENTION

The present invention provides a turbomachine which comprises an annular flow duct and a housing structure surrounding the flow duct and a multiplicity of guide vanes and rotor blades which are arranged in the flow duct. The rotor blades are rotatably accommodated in the housing structure and the guide vanes are fixed in the housing structure, a plurality of guide vanes forming an annular guide vane ring. The housing structure has a seal in a region of a radially inner flow duct boundary to prevent hot gas escaping from the flow duct, said seal being arranged on guide vane roots of the guide vanes of the guide vane ring via a seal support and forming a seal against a rotatable seal surface. The seal support is formed from an intermetallic material.

The present invention further provides a method for producing a seal support for a turbomachine. The method comprises casting or forging a semi-finished product for the seal support from an intermetallic material, and thereafter removing edge zones of the semi-finished product entirely.

Advantageous configurations are the subject matter of dependent claims.

The present invention proposes producing the seal support for the seal of an inner air seal from an intermetallic material, in particular a TiAl material, as intermetallic materials, and in particular TiAl materials, have a low specific weight but can also fulfill the requirements of thermal stability and strength in order to thereby reduce the weight of a turbomachine and in particular of an aero engine. In particular, the present invention proposes first casting or forging the seal support in the form of a semi-finished product, in order to then remove edge zones of the semi-finished product entirely, where in particular mechanical machining, such as material removing machining, can be used. In so doing, critical edge zones of the material can be removed and a defined, uniform surface can be generated, making complete component testing possible. In this manner, the safety aspects for safe and reliable operation of the turbomachine can be taken into account.

An intermetallic material is understood as a material having at least one intermetallic phase in its microstructure, wherein in particular the majority (with respect to volume or weight) of the microstructure is formed from intermetallic phases. In particular, the intermetallic material can consist almost entirely of one or more intermetallic phases if, for example, the intermetallic phases have a high homogeneity region in the phase diagram such that alloying constituents can be taken up in a broad region. Examples of this are materials based on titanium aluminides, which can preferably be used in the context of the present invention.

Intermetallic phases are understood as a homogeneous chemical compound consisting of two or more metals which, as well as a pure metallic bond, have fractions of other bond types such as covalent bonds or ionic bonds, i.e. ceramic bond types, which results in a particularly high strength of the lattice structure and thus of the material. Titanium aluminides, but also iron aluminides or other intermetallic materials, thus have high strengths and at the same time low specific weights and are thus particularly, although not exclusively, suited to the present invention.

For this reason, TiAl materials can be used according to the present invention for forming the seal support. In the context of the present invention, a TiAl material is understood as any material consisting predominantly of titanium and aluminum The TiAl material can thus in particular be formed from a titanium aluminide and comprise a titanium aluminide such as $\gamma$-TiAl or $\alpha_2$-Ti$_3$Al. In particular, it can be a TiAl alloy based on a titanium aluminide, such as $\gamma$-TiAl, to which suitable alloying constituents are added. In particular, it can be what is termed a TNM or TNB alloy comprising fractions of niobium and/or molybdenum.

The seal support can be formed as a one-piece ring, or as several parts from a plurality of ring segments which are then assembled to form a ring similar to the guide vane ring.

For arranging on the guide vane ring, the seal support can have, at its radially outer end, a connecting region while, at the radially inner end, an arrangement region is provided for arranging the seal.

Various seals can be considered, for example honeycomb seals, which can be deposited in the arrangement region of the seal support. Alternatively, it is also possible to provide a brush seal, such that a corresponding brush element can be attached in the arrangement region.

In addition, the seal support can have further functionalities, such as a further blocking portion, in order to avoid, together with an adjacent rotor blade ring, the penetration of hot gas into the housing structure. To that end, an axially projecting blocking portion, which can have a step-like shape with a plurality of S-shaped bends in order to increase flow resistance with respect to hot gas, can be formed between the radially inner end and the radially outer end of the seal support.

In the present description, the terms 'radial' and 'axial' refer to the flow duct, such that an axial direction runs along the flow direction in the flow duct and a radial direction runs transverse thereto.

Moreover, the components which delimit the flow duct are referred to as a housing structure even if the components, such as the shrouds of the guide vanes and rotor blades, are arranged on the corresponding guide vane rings or rotor blade rings.

BRIEF DESCRIPTION OF THE DRAWINGS

In the appended, purely schematic drawings.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

Figure 1:
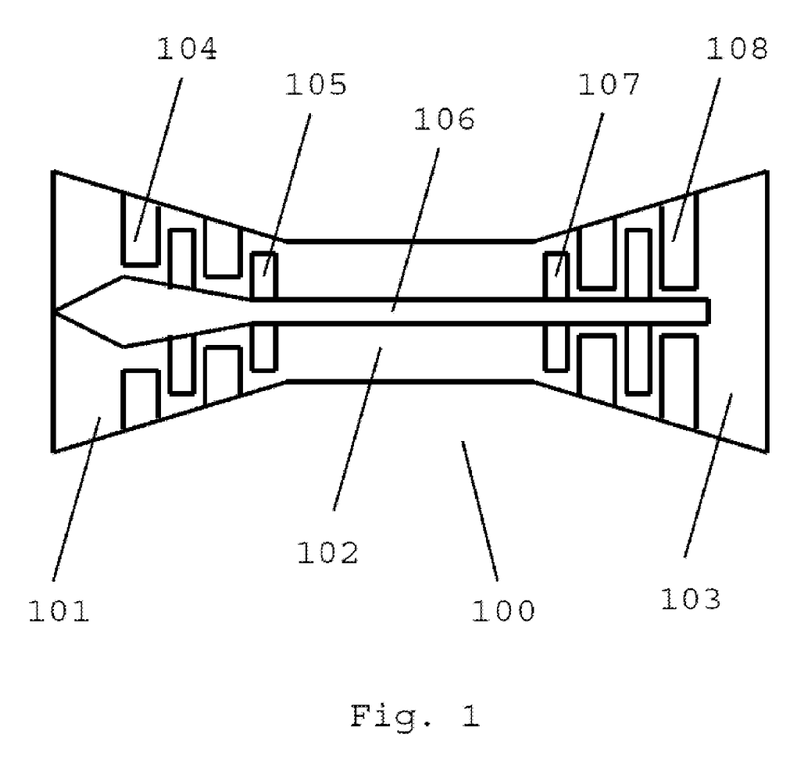
FIG. 1 shows a representation of a turbomachine in which the present invention can be used.

FIG. 1 shows, in a purely schematic manner, a representation of a turbomachine in the form of a gas turbine 100 having a compressor 101, a combustor 102 and a turbine 103. The intake air is compressed in the compressor 101 by the annularly arranged guide vanes 104 and rotor blades 105 and is pushed into the combustor 102, where it is ignited together with the fuel such that, in the turbine, the combustion gases flowing out of the combustor can drive the rotor blades 107, which are arranged between corresponding guide vanes 108 on a rotatable shaft 106 which simultaneously drives the rotor blades 105 of the compressor. As already indicated in relation to FIG. 10 when describing the prior art, the seal support according to the invention can be arranged on vane roots of a guide vane row, as for example described in relation to the gas turbine 100.

Figure 2:
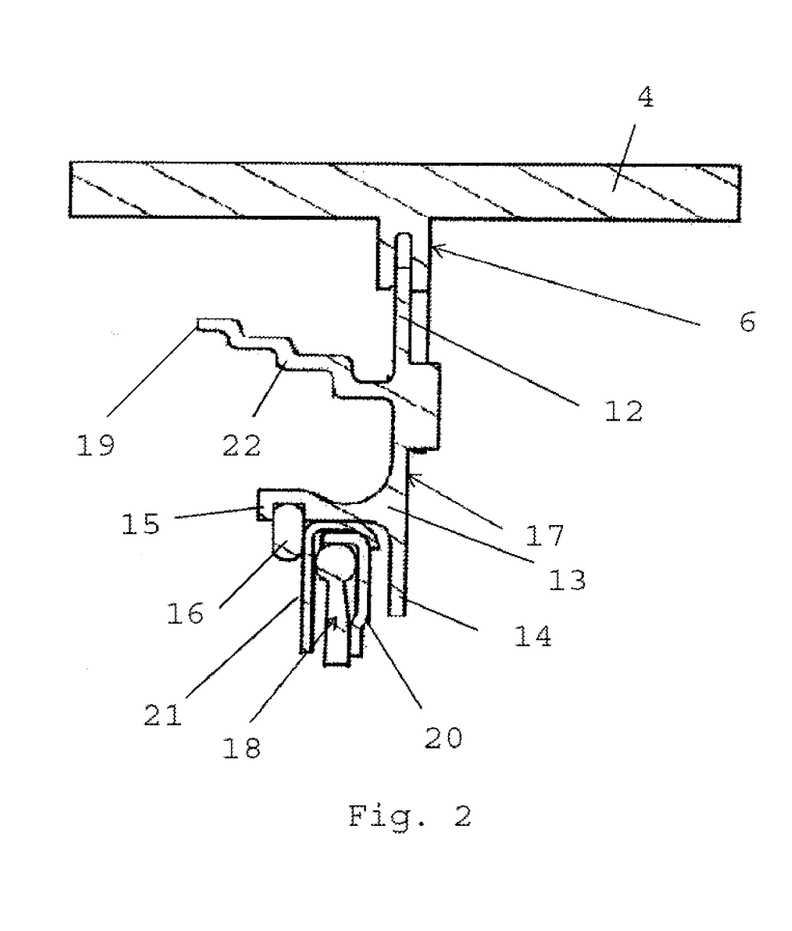
FIG. 2 shows a partial section view of a seal support according to the invention.

FIG. 2 shows a seal support 17 made of a TiAl material, such as a TiAl alloy based on $\gamma$-titanium aluminide, which is formed as a ring as a single piece or in segments, the representation of FIG. 2 merely showing a cross section through part of the ring.

The seal support 17 has, at its radially outer end, a connecting region 12 by means of which the seal support 17 is arranged in a plurality of vane roots 6 of the guide vanes arranged together to form a guide vane ring, where in FIG. 2 the guide vanes are not represented and merely the inner shroud 4 of a guide vane or of the guide vane ring is shown.

At the opposite, inner radial end of the seal support 17 there is provided an arrangement region 13 which serves to arrange a seal 18 which interacts with a rotating seal surface of an adjacent rotor blade ring. The rotating seal surface (not shown) can be arranged on the rotor or the disk of the adjacent rotor blade ring in an appropriate manner In the exemplary embodiment shown in FIG. 2, the seal 18 is formed as a brush seal which is held in the arrangement region 13 of the seal support 17 by way of hook rings 20, 21. To that end, the arrangement region 13 has an annular connector 14, which serves as an abutment surface for the hook rings 20, 21 or the seal 18, and an axially extending retaining portion 15, which serves to accommodate a clamping ring 16 which holds the seal 18 with the hook rings 20, 21 opposite the annular connector 14.

However, instead of the brush seal 18, a honeycomb seal 8, as shown in FIG. 1, can also be arranged on the arrangement region 13. To that end, the annular connector 14 in the arrangement region 13 can be dispensed with and the axially extending retaining portion 15 can serve as a surface for arranging the honeycomb seal 8.

In the embodiment of the seal support 17 of FIG. 2 there is formed, between the radially outer connecting region 12 and the radially inner arrangement region 13, an axially projecting blocking portion 19, which is provided to interact with a correspondingly formed component of an adjacent rotor blade row, so as to prevent a direct radial outflow of the hot gas from the flow duct into the radially inner housing structure.

The radially projecting blocking portion is, in the exemplary embodiment shown in FIG. 2, formed in a step-like manner and has a plurality of portions 22 bent in an S-shape in order to present greater flow resistance to gas flowing past it.

The seal support 17 is made as a single piece from a TiAl material such as a γ-TiAl alloy having alloying constituents consisting of niobium and/or molybdenum, where production can involve casting or forging. In both cases, however, once a near net shape semi-finished product has been produced, the surface region is removed by machining in order to remove critical edge regions of the material, to produce a smooth and clean surface and to ensure that it is possible to carry out reliable defect testing of the component.

It is thus possible to use lightweight titanium aluminides as seal support for a seal in the region of what is termed the inner air seal (IAS) of a turbomachine, without negatively affecting the safety requirements of reliable and fault-free operation of the turbomachine.

FIGS. 3 to 9 show various embodiments of a seal support 17 and in particular the various possibilities for attaching a corresponding seal support or seal support ring to the vane roots 6 of guide vanes 2 or of a guide vane row, wherein suitable connecting elements are formed integrally in the seal support 17. As the embodiments of the seal support in FIGS. 3 to 9 correspond largely to the embodiment in FIG. 2, identical or similar components are provided with identical reference signs and identical components will not be described anew.

Figure 3:
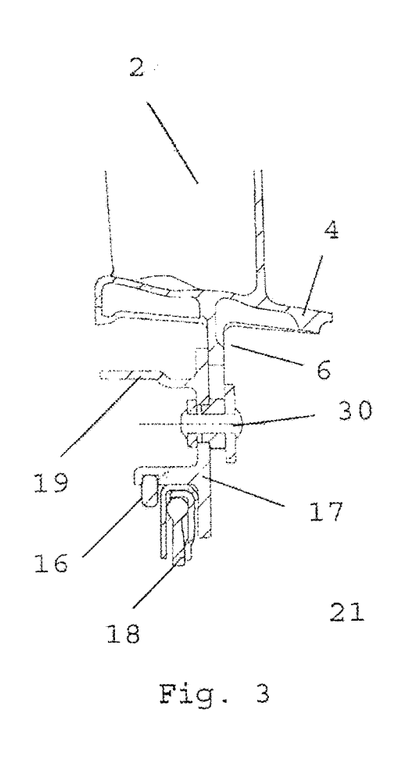
FIG. 3 shows a section representation, similar to FIG. 2, of a further embodiment of a seal support.

FIG. 3 shows a first embodiment for arranging a seal support 17 on vane roots 6. The seal support 17 is connected to the vane roots 6 by way of a plurality of rivet connections 30 which are distributed over the circumference of the seal support ring, such that corresponding openings for feeding through the rivets are provided both in the seal support 17 and in the vane roots 6.

Figure 4:
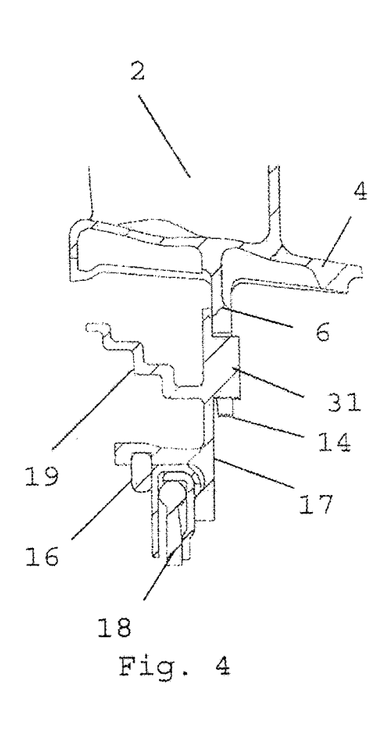
FIG. 4 shows a section representation of a further embodiment of a seal support, similar to FIGS. 2 and 3.
Figure 5:
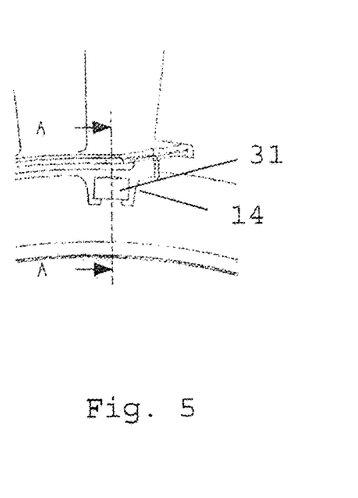
FIG. 5 shows a partial side view of the arrangement, consisting of guide vane and seal support, of FIG. 4.

In the embodiment of FIGS. 4 and 5, what are termed sliding blocks 31 are integrated into the seal support 17, each of these sliding blocks being formed by a plate which is arranged at a distance from the seal support ring and which defines an intermediate space, between the ring main body and the plate of the sliding block, into which projections 14 of a vane root 6 can engage, so as to provide axial securing. In the exemplary embodiment shown in FIGS. 4 and 5, where FIG. 5 indicates the line of section A-A shown in FIG. 4, two projections 14 are provided arranged to the left and to the right next to a connection between the spaced-apart plate and the main ring of the seal support 17. A plurality of sliding blocks 31 for arranging the guide vanes 2 on the seal support ring 17 are provided along the circumference of the annular seal support 17.

Figure 6:
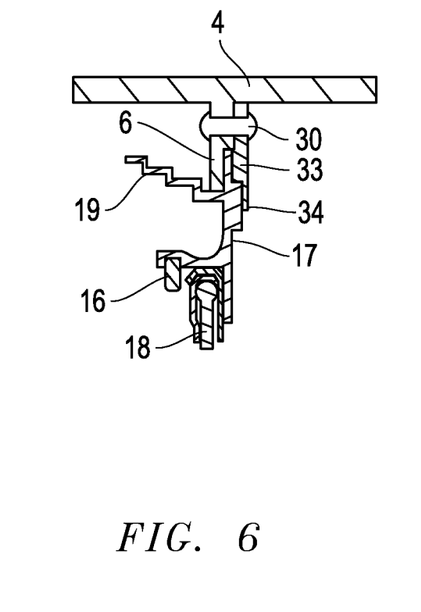
FIG. 6 shows a further section representation, similar to FIGS. 2 to 4, of a further embodiment of a seal support.
Figure 7:
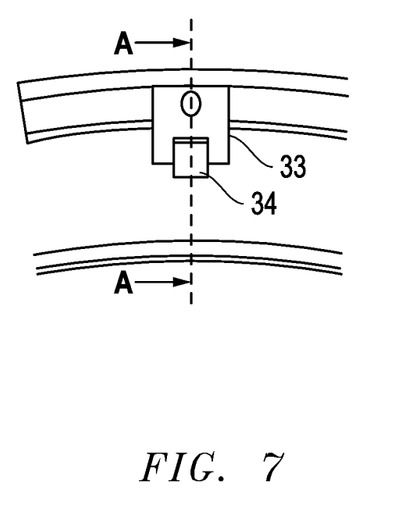
FIG. 7 shows a side view of the arrangement, consisting of guide vane root and seal support, of FIG. 6.
Figure 8:
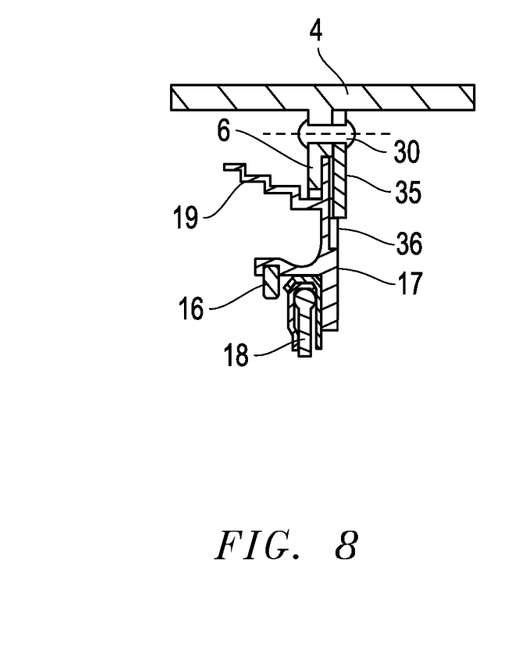
FIG. 8 shows a further exemplary embodiment of a seal support in a section view similar to the representations of FIGS. 2, 3, 4 and 6.
Figure 9:
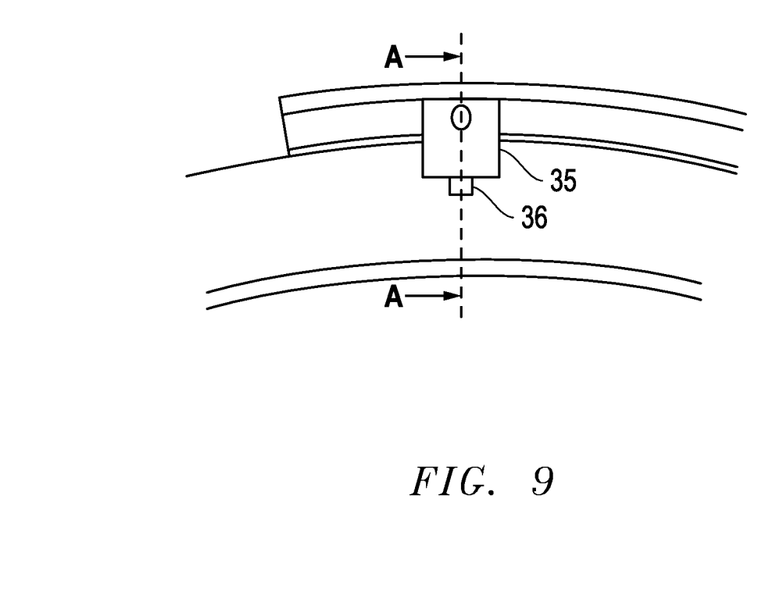
FIG. 9 shows a side view of the arrangement, consisting of guide vane root and seal support, of FIGS. 8.

In the embodiment of FIGS. 6 and 7, in which the line of section A-A shown in FIG. 6 is indicated in the view of FIG. 7, there are formed along the circumference of the seal support ring 17 what are termed groove blocks 34, into which groove plates 33 can engage, which are in turn connected to the vane root 6 of a guide vane ring by way of in each case one rivet connection 30. The groove plate 33 provides axial securing and the groove blocks 34, which engage in the groove of the groove plate 33, provide in addition rotational securing in the direction of the annular circumference of the seal support ring 17.

In the embodiment of FIGS. 8 and 9, in which again FIG. 9 indicates the line of section A-A which forms the cross section view of FIG. 8, retaining plates 35 are provided which, again, are arranged on the vane root 6 by way of a rivet connection 30, wherein the retaining plates 35 engage in grooves 36 on the seal support ring 17 such that, in this case too, both axial securing and rotational securing in the circumferential direction of the seal support ring 17 are provided.

While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A turbomachine, wherein the turbomachine comprises an annular flow duct and a housing structure surrounding the flow duct and guide vanes and rotor blades which are arranged in the flow duct, the rotor blades being rotatably accommodated in the housing structure and the guide vanes being fixed in the housing structure, and a plurality of the guide vanes forming an annular guide vane ring, and wherein the housing structure has a seal in a region of a radially inner flow duct boundary to prevent hot gas escaping from the flow duct, said seal being arranged on guide vane roots of the guide vanes of the guide vane ring via a seal support and sealing against a rotatable seal surface, said seal support being formed from an intermetallic material.

2. The turbomachine of claim 1, wherein the intermetallic material is a TiAl material and is formed of a titanium aluminide or comprises a titanium aluminide.

3. The turbomachine of claim 2, wherein the seal support is formed as a one-piece ring.

4. The turbomachine of claim 2, wherein the seal support is present as several parts from a plurality of ring segments.

5. The turbomachine of claim 1, wherein the intermetallic material is a TNM alloy.

6. The turbomachine of claim 1, wherein the intermetallic material is a TNB alloy.

7. The turbomachine of claim 1, wherein the seal support is cast or forged and surface-processed.

8. The turbomachine of claim 1, wherein the seal support is formed as a one-piece ring.

9. The turbomachine of claim 1, wherein the seal support is present as several parts from a plurality of ring segments.

10. The turbomachine of claim 1, wherein the seal support has, at a radially outer end, a connecting region for arranging on the guide vane roots and, at a radially inner end, an arrangement region for arranging the seal, an axially projecting blocking portion being formed between the radially inner end and the radially outer end.

11. The turbomachine of claim 10, wherein the blocking portion comprises at least one S-shaped bend.

12. The turbomachine of claim 10, wherein the blocking portion comprises a plurality of S-shaped bends.

13. The turbomachine of claim 10, wherein the intermetallic material is a TiAl material and is formed of a titanium aluminide or comprises a titanium aluminide.

14. The turbomachine of claim 1, wherein the seal is a brush.

15. The turbomachine of claim 1, wherein the seal is a honeycomb structure.

16. The turbomachine of claim 1, wherein the seal support has, at a radially outer end, a connecting region for arranging on the guide vane roots and, at a radially inner end, an arrangement region for arranging the seal.

17. The turbomachine of claim 16, wherein the seal support is present as a ring which is connected to vane roots by a plurality of rivet connections which are distributed over a circumference of the seal support ring.

18. The turbomachine of claim 16, wherein sliding blocks are integrated into the seal support, each of the sliding blocks being formed by a plate which is arranged at a distance from a seal support ring and defines an intermediate space between a ring main body and the plate of the sliding block, into which projections of a vane root can engage.

19. The turbomachine of claim 16, wherein groove blocks into which groove plates can engage are formed along a circumference of a seal support ring, the groove plates being connected to a vane root of a guide vane ring by a rivet connection.

20. The turbomachine of claim 16, wherein retaining plates are arranged on a vane root by a rivet connection and engage in grooves on a seal support ring.

* * * * *